United States Patent
Huang

(10) Patent No.: US 9,151,647 B1
(45) Date of Patent: Oct. 6, 2015

(54) VERTICAL FLOW METER EQUIPPED

(71) Applicant: Ya-Ping Huang, Kaohsiung (TW)

(72) Inventor: Ya-Ping Huang, Kaohsiung (TW)

( * ) Notice: Subject to any disclaimer, the term of this patent is extended or adjusted under 35 U.S.C. 154(b) by 49 days.

(21) Appl. No.: 14/242,056

(22) Filed: Apr. 1, 2014

(51) Int. Cl.
  *G01F 1/00* (2006.01)
  *G01F 1/05* (2006.01)
(52) U.S. Cl.
  CPC .................................... *G01F 1/05* (2013.01)
(58) Field of Classification Search
  USPC .................................... 73/861, 861.73, 202.5
  See application file for complete search history.

(56) References Cited

U.S. PATENT DOCUMENTS 3,640,136 A * 2/1972 Nolte .......................... 73/861.73
7,296,465 B2 * 11/2007 Ding et al. .................. 73/202.5

* cited by examiner

*Primary Examiner* — Jewel V Thompson
(74) *Attorney, Agent, or Firm* — Muncy, Geissler, Olds & Lowe, P.C.

(57) ABSTRACT

A vertical flow meter comprises a vertical barrel, an adjustment mechanism and an induction mechanism. The vertical barrel has a flow passage inside to house a vertical rod and a magnetic element coupling on the vertical rod. The adjustment mechanism straddles a holding plate and a scale plate that are located at two sides of the vertical barrel, and includes an adjustment portion at one side thereof, at least one adjustment member corresponding to a second elongate slot of the scale plate and fastening to the adjustment portion, a protrusive connection portion at another side opposite to the adjustment portion, and a connection plank connecting with the adjustment portion and protrusive connection portion. The induction mechanism is disposed at one side of the protrusive connection portion. Through magnetic attraction between the induction mechanism and the magnetic element, the adjustment mechanism can be moved upward or downward on the scale plate.

10 Claims, 6 Drawing Sheets

VERTICAL FLOW METER EQUIPPED

FIELD OF THE INVENTION

The present invention relates to a flow meter and particularly to a vertical flow meter.

BACKGROUND OF THE INVENTION

Many types of vertical flow meters are now available on the market. FIG. 1 illustrates an example that a vertical flow meter 1 is assembled with an upper flow tube 11 and a lower flow tube 12 for various types of liquids to flow through. The vertical flow meter 1 includes a holding plate 13 installed on the back side thereof with a guide slot 131 formed on the holding plate 13, and a screw fastener 141 run through the guide slot 131 to fasten an induction mechanism 14 to the holding plate 13. When the vertical flow meter 1 is in use, the back side of the vertical flow meter 1 and a wall surface 15 are very close and spaced from each other with only a small gap 16 which makes adjustment of position of the induction mechanism 14 difficult. To do the adjustment of the induction mechanism 14, first, the vertical flow meter 1 has to be detached, and the screw fastener 141 has to be unfastened. After the position of the induction means 14 has been adjusted, the screw fastener 141 has to be fastened again. Hence for the conventional vertical flow meter 1, adjustment of the position of the induction mechanism 14 is very inconvenient and time-consuming. There is still room for improvement.

SUMMARY OF THE INVENTION

The present invention aims to provide improvement to solve the problem of the conventional flow meter that the induction mechanism inside is difficult to make adjustment To achieve the foregoing object the present invention provides a vertical flow meter. The vertical flow meter comprises a vertical barrel, a holding plate, a scale plate, an adjustment mechanism and an induction mechanism. The vertical barrel includes an inlet holder at a lower end thereof, an outlet holder at an upper end thereof and spaced from the inlet holder, a flow passage formed therein, a vertical rod held in the flow passage and fastened to the upper end and the lower end thereof, and a magnetic element coupled on the vertical rod. The inlet holder includes a protrusive inlet coupling portion extended from one side thereof with an inlet communicating with the flow passage. The outlet holder includes a protrusive outlet coupling portion extended from one side thereof toward the same direction of the protrusive inlet coupling portion with an outlet communicating with the flow passage. The holding plate is located at one side of the vertical barrel where the protrusive inlet coupling portion and protrusive outlet coupling portion are located, and includes a first elongate slot. The scale plate is located at another side of the vertical barrel remote from the holding plate, and includes a second elongate slot and a scale formed on the surface at one side of the second elongate slot. The adjustment mechanism straddles the holding plate and the scale plate, and includes a adjustment portion at one side thereof, a protrusive connection portion at another side opposite to the adjustment portion, a connection plank connecting with the adjustment portion and the protrusive connection portion, at least one adjustment member corresponding to the second elongate slot and fastening to the adjustment portion, and an indicator formed on one end of the adjustment portion to indicate the scale of the second slot. The induction mechanism is located at one side of the protrusive connection portion. The induction mechanism and the protrusive connection portion run through the first elongate slot of the holding plate to move upward or downward on the holding plate.

The invention, by means of the structure set forth above, compared with the conventional techniques, provides many advantages, notably:

The invention has the holding plate and the scale plate located at two sides of the vertical barrel, the adjustment mechanism straddling the holding plate and the scale plate and an induction mechanism located at one side of the adjustment mechanism. When the vertical flow meter is coupled on pipes, flow of liquid from the pipes pushes the magnetic element to move upward or downward. By moving the adjustment mechanism upward or downward, position of the induction mechanism can be easily adjusted to form magnetic attraction with the magnetic element, so as to display the flow amount of the vertical flow meter.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
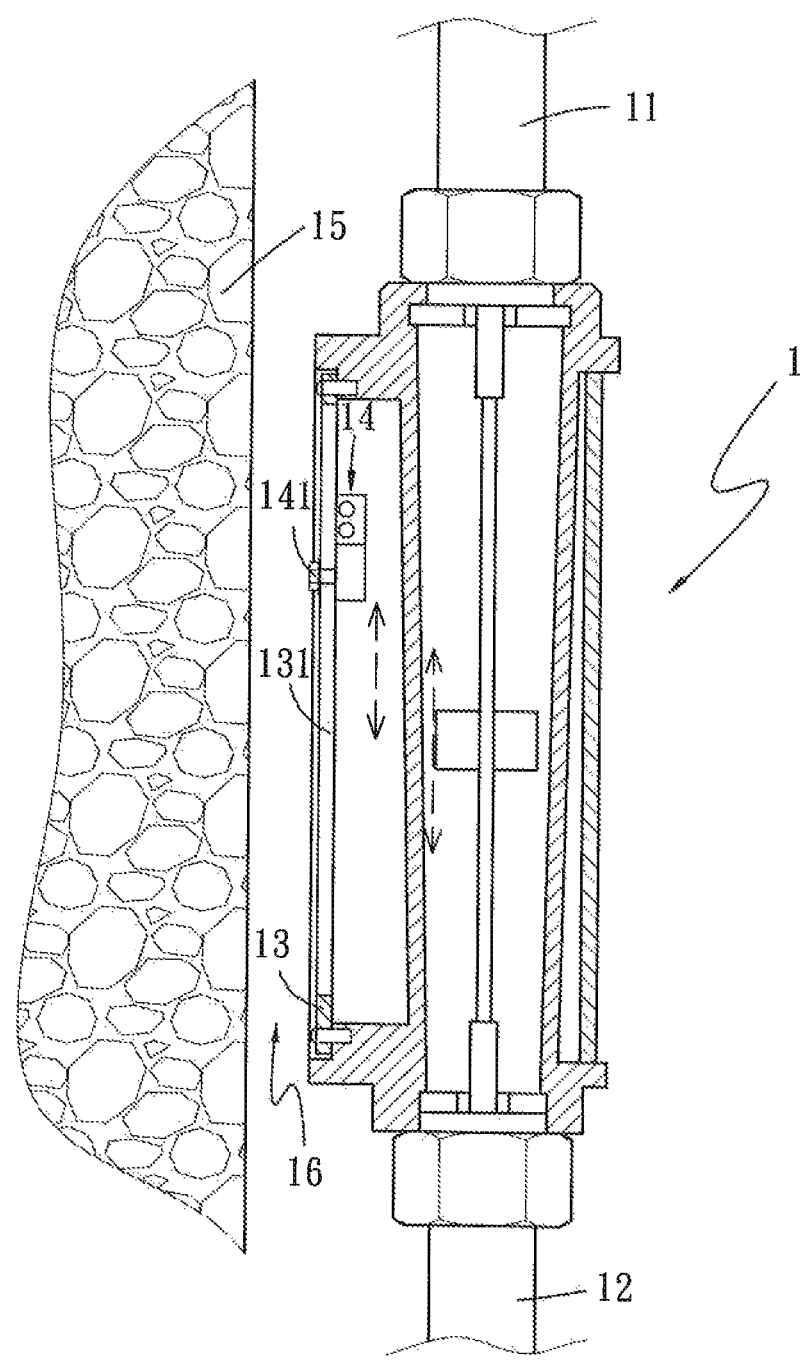
FIG. 1 is a schematic configuration of a conventional vertical flow meter.
Figure 2:
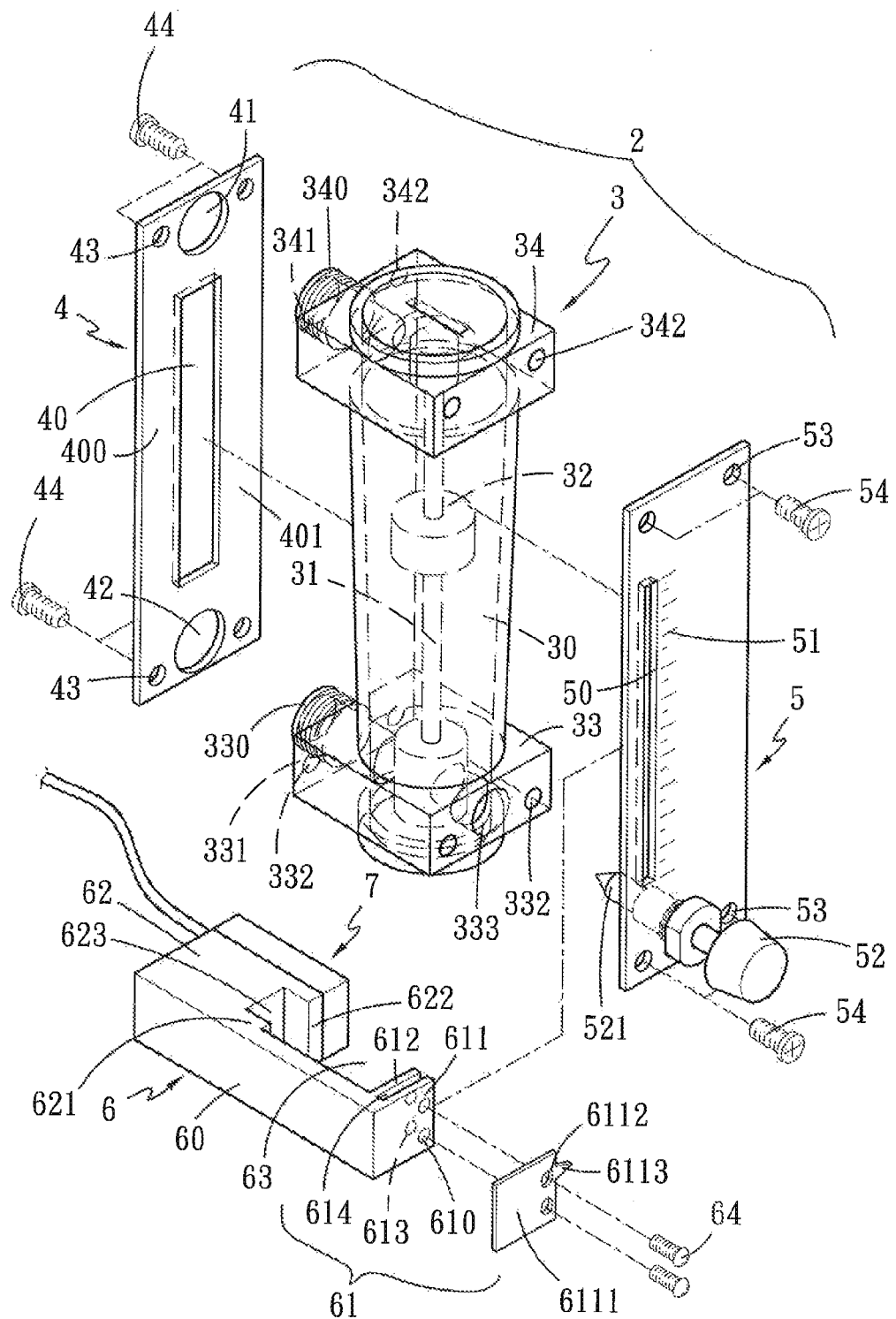
FIG. 2 is an exploded view of the invention.
Figure 3:
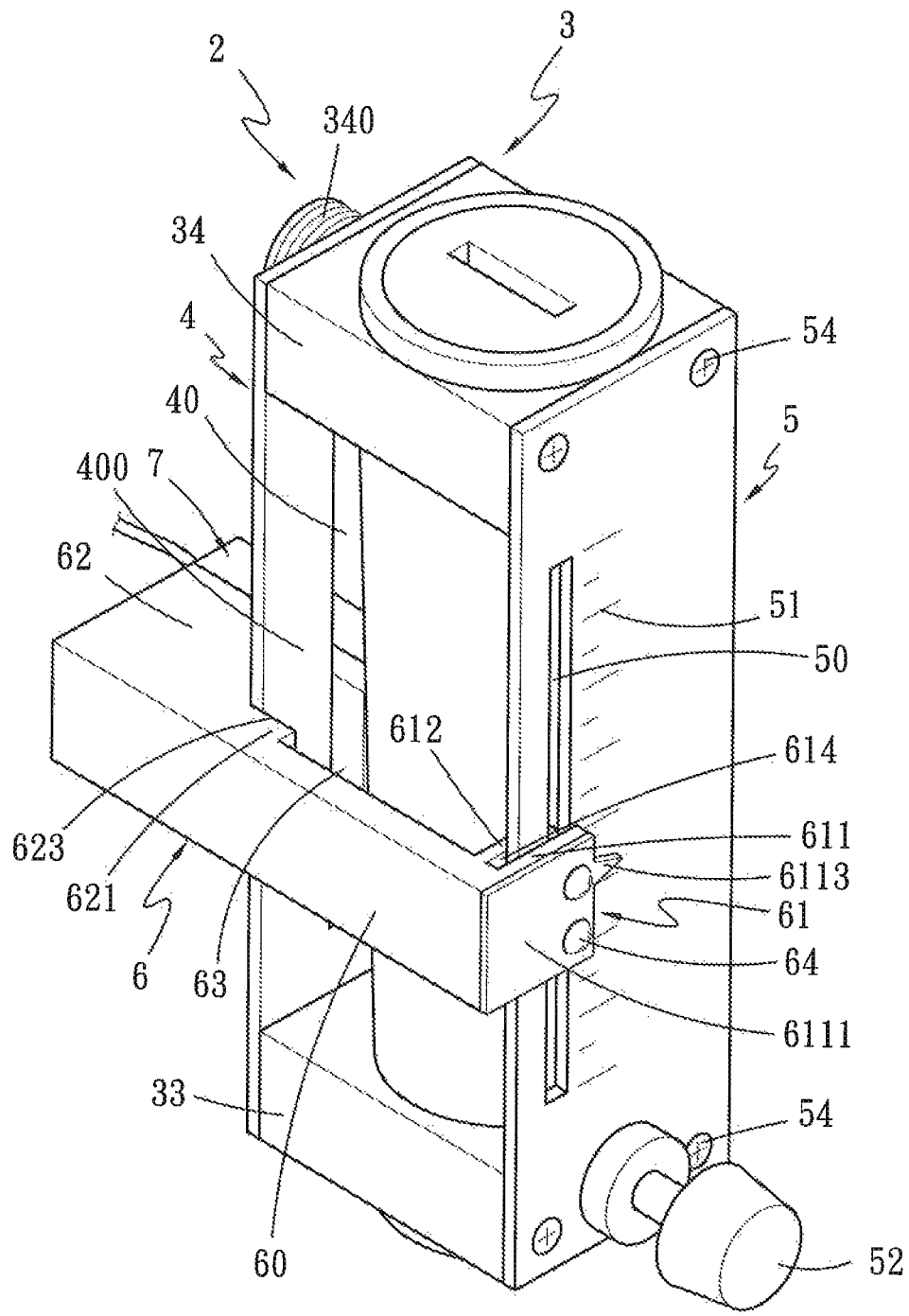
FIG. 3 is a perspective view of the invention.
Figure 4:
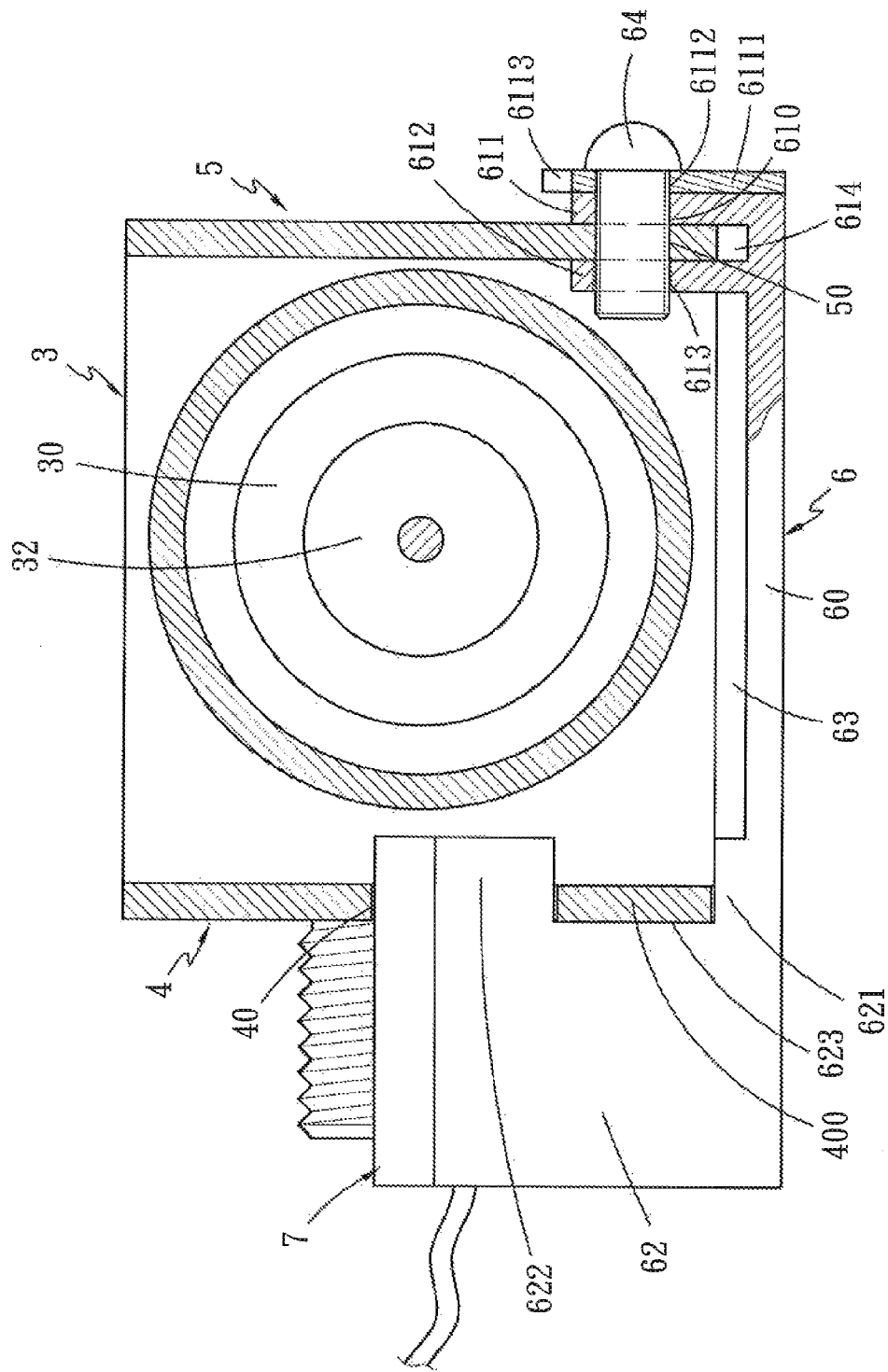
FIG. 4 is a top view of the invention.

Please referring to FIGS. 2, 3 and 4, the present invention aims to provide a vertical flow meter 2 which comprises a vertical barrel 3, a holding plate 4, a scale plate 5, an adjustment mechanism 6 and an induction mechanism 7.

The vertical barrel 3 includes an inlet holder 33 at a lower end thereof, an outlet holder 34 at a upper end thereof and spaced from the inlet holder 33, a flow passage 30 formed therein, a vertical rod 31 held in the flow passage 30 and fastened to the upper end and the lower end thereof, and a magnetic element 32 coupled on the vertical rod 31. The inlet holder 33 includes a protrusive inlet coupling portion 330 extended from one side thereof, an inlet 331 formed on the protrusive inlet coupling portion 330, an orifice 333 formed on another side thereof opposite to the protrusive inlet coupling portion, two first fastening holes 332 at the one side thereof and another two first fastening holes 332 at the another side thereof. The inlet 331 and the orifice 333 communicate with the flow passage 30. The outlet holder 34 also includes a protrusive outlet coupling portion 340 extended from one side thereof towards the same direction of the protrusive inlet coupling portion 330, an outlet 341 formed on the protrusive outlet coupling portion 340 and communicating with the flow passage 30, two second fastening holes 342 at the one side thereof, and another two second fastening holes 342 at another side thereof opposite to the protrusive outlet coupling portion 340. The protrusive inlet coupling portion 330 and the protrusive outlet coupling portion 340 have respectively external threads for pipes to couple with.

The holding plate 4 is located at one side of the vertical barrel 3 where the protrusive inlet coupling portion 330 and protrusive outlet coupling portion 340 are located. The holding plate 4 includes a first elongate slot 40 to divide the holding plate into a left side 400 and a right side 401, a first opening 41 above the first elongate slot 40 run through by the protrusive outlet coupling portion 340 and a second opening 42 below the first elongate slot 40 run through by the protrusive inlet coupling portion 330. The holding plate 4 also includes two first apertures 43 at an upper side thereof corresponding to the two second fastening holes 342 of the outlet holder 34, and another two first apertures 43 at a lower side thereof corresponding to the first fastening holes 332 of the inlet holder 33. Then the first apertures 43 at the upper and lower sides of the holding plate 4, the second fastening holes 342 and the first fastening holes 332 of the vertical barrel 3 can be run through by a plurality of first fastening elements 44 such as screws, so that the holding plate 4 can be fastened to one side of the vertical barrel 3.

The scale plate 5 is located at another side of the vertical barrel 3 remote from the holding plate 4, and includes a second elongate slot 50 at one side thereof corresponding to the left side 400 of the holding plate 4, and a scale 51 formed on the surface thereof and at one side of the second elongate slot 50. The scale plate 5 further includes an adjustment knob 52 at a lower side thereof which includes an adjustment rod 521 running through the orifice 333 and abutting the inlet 331 to adjust flow amount from entering of the vertical barrel 3, two second apertures 53 at the upper side thereof corresponding to the second fastening holes 342 of the outlet holder 34, and another two second apertures 53 at lower side thereof corresponding to the first fastening holes 332 of the inlet holder 33. Thereby, the second apertures 53 at the upper and lower sides of the scale plate 5, the second fastening holes 342 and the first fastening holes 332 of the vertical barrel 3 can be run through by a plurality of second fastening elements 54 such as screws, so that the scale plate 5 can be fastened to the another side of the vertical barrel 3.

The adjustment mechanism 6 straddles the holding plate 4 and the scale plate 5, and includes an adjustment portion 61 at one side thereof, a protrusive connection portion 62 at another side opposite to the adjustment portion 61, a connection plank 60 connecting with the adjustment portion 61 and the protrusive connection portion 62, and a wedge notch 63 between the adjustment portion 61 and the protrusive connection portion 62 to accommodate the vertical barrel 3. The adjustment portion 61 includes an anchor block 611, a holding block 612 spaced from the anchor block 611 to form a guide slot 614 therebetween them to receive the scale plate 5 and guide the adjustment mechanism 6 to move upward or downward on the scale plate 5, and an adjustment plate 6111 located at one side of the anchor block 611 remote from the holding block 612. The protrusive connection portion 62 includes a first boss 621 and a second boss 622 that are extended from toward the wedge notch 63, and a guide notch 623 formed between the first boss 621 and the second boss 622 to accommodate the left side 400 of the holding plate 400 so that the adjustment mechanism 6 is moved upward or downward on the holding plate 4 and scale plate 5. The anchor block 611 and the holding block 612 respectively include at least one first coupling hole 610 and at least one second coupling hole 613 corresponding to the second elongate slot 50 of the scale plate 5, while the adjustment plate 6111 includes at least one adjustment aperture 6112 corresponding to and greater than the first coupling hole 610. The adjustment mechanism 6 also includes at least one adjustment member 64, such as a screw, to penetrate through the adjustment aperture 6112, the first coupling hole 610, the second elongate slot 50 and is fastened to the second coupling hole 613, so as to fasten the adjustment plate 611 and the scale plat 5 to the adjustment mechanism 6. An indicator 6113 could be formed at one end of the adjustment plate 6111 to indicate the scale 51 on the scale plate 5. Through the adjustment member 64, the adjustment plate 6111 can be adjusted easily to a required position for tuning the indicator 6113.

The induction means 7 is located at one side of the second boss 622 remote from the first boss 621, and the induction means 7 and the second boss 622 are inserted into the first elongate slot 40 of the holding plate 4. Also, the adjustment member 64 is run through the adjustment aperture 6112 of the adjustment plate 6111, the first coupling hole 610 of the anchor block 611, the second elongate slot 50 of the scale plate 5 and fastened to the second coupling hole 613. Therefore, the adjustment mechanism 6 straddles the holding plate 4 and the scale plate 5 tightly and is movable on the holding plate 4 and the scale plate 5 to bring the induction means 7 to a required location to form induction with the magnetic element 32.

Figure 6:
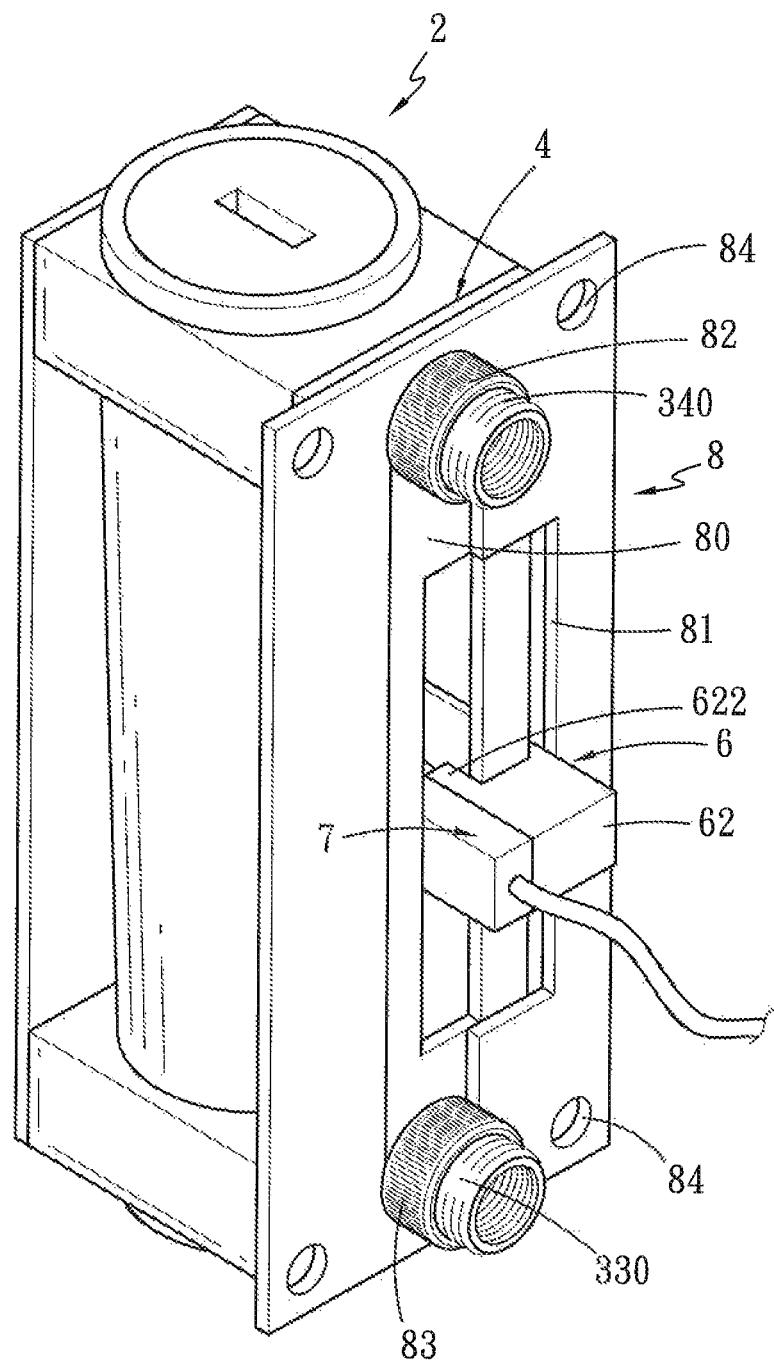
FIG. 6 is a rear perspective view of the invention showing the vertical flow meter coupled on a holding plate.

Also referring to FIG. 6, the vertical flow meter 2 of the invention further includes a positioning board 8 which includes a third elongate slot 80 with an upper side run through by the protrusive outlet coupling portion 340 and an lower side run through by the protrusive inlet coupling portion 330, then the positioning board 8 can be fastened to one side of the holding plate 4 remote from the vertical barrel 3 via using a first screw fastener 82 and a second screw fastener 83 to respectively screw with the external threads of the protrusive outlet coupling portion 340 and the protrusive inlet coupling portion 330. The third elongate slot 80 further includes a notch 81 at one side thereof to allow the protrusive connection portion 62 and the induction means 7 to pass through and move upward or downward. The positioning board 8 further includes a plurality of fastening holes 84 at an upper end and an lower end thereof to allow a plurality of positioning elements (not shown in the drawings) to run through and fasten the vertical flow meter 2 to the pipes. In the event that the pipes do not have a plane for installing the vertical flow meter 2, the vertical flow meter 2 may also be screwed on a wall (not shown in the drawings).

Figure 5:
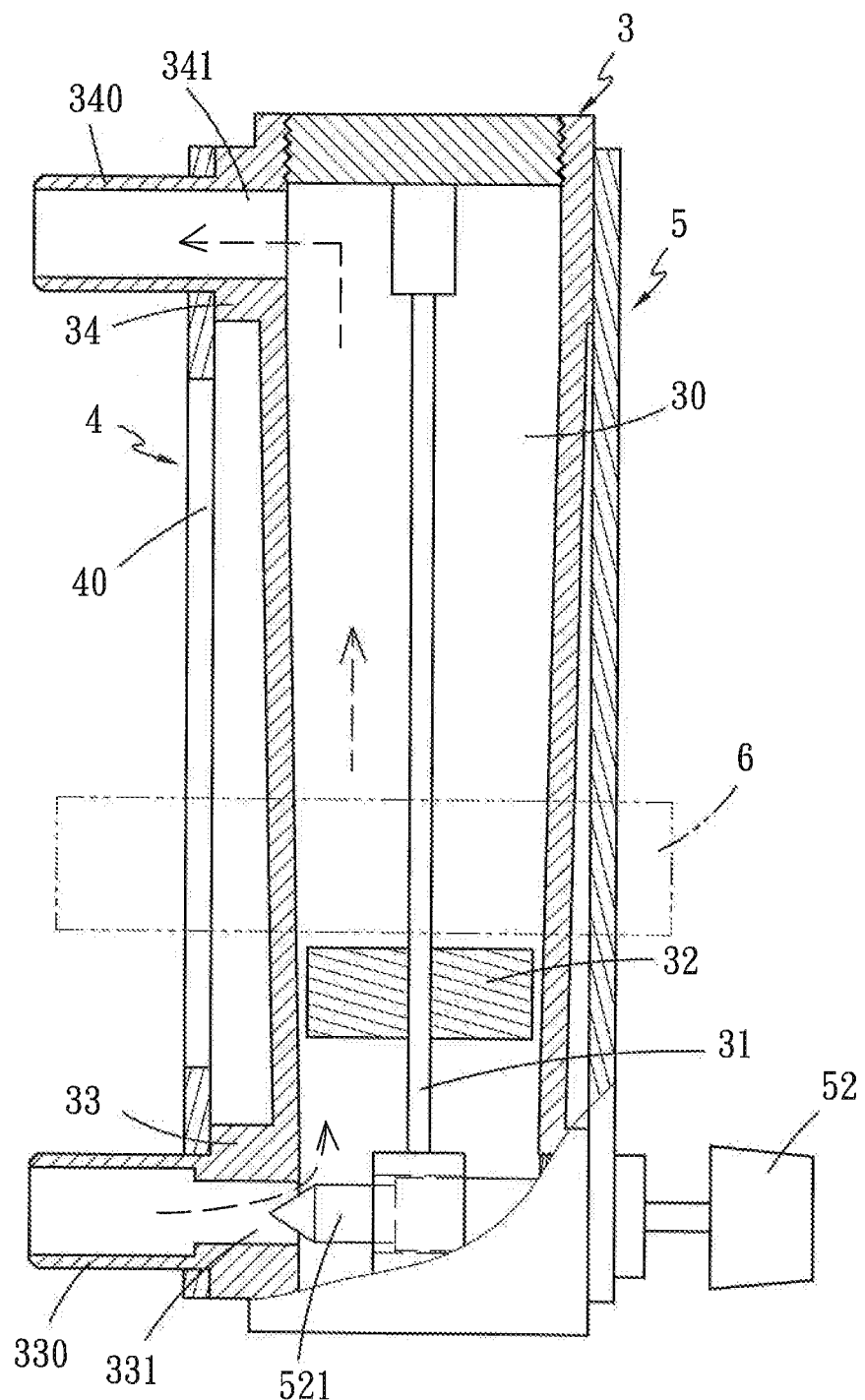
FIG. 5 is a schematic view of the invention showing liquid flow inside a vertical barrel.

Please referring to FIGS. 2, 3 and 5, when the vertical flow meter 2 is in use, the protrusive inlet coupling portion 330 and protrusive outlet coupling portion 340 of the a vertical barrel 3 are coupled to the pipes (not shown in the drawings). The adjustment rod 521 of the adjustment knob 52 can be used to adjust the flow amount to let liquid (shown by arrows in FIG. 5) enter the flow passage 30 of the vertical barrel 3 through the inlet 331, and discharge from the outlet 341. When the flowing liquid passes the vertical barrel 3, the magnetic element 32 is pushed by it and movable upward or downward, and the induction means 7 coupled with the protrusive connection portion 62 can form magnetic attraction with the magnetic element 32 by adjusting position of the adjustment mechanism 6. Therefore, the adjustment mechanism 6 can move corresponding to the movement of the magnetic element 32, which changes according to the flow amount, and display the liquid level of the flowing liquid amount by the indicator 6113.

What is claimed is:

1. A vertical flow meter, comprising:
 a vertical barrel including a flow passage formed therein to house a vertical rod fastened to an upper end and a lower end thereof and a magnetic element coupled on the vertical rod, and a protrusive inlet coupling portion and a protrusive outlet coupling portion spaced from each other at the lower end and the upper end of the vertical barrel respectively and communicating with the flow passage;

a holding plate which is located at one side of the vertical barrel and includes a first elongate slot, a first opening above the first elongate slot run through by the protrusive outlet coupling portion, and a second opening below the first elongate slot run through by the protrusive inlet coupling portion;

a scale plate which is located at another side of the vertical barrel remote from the holding plate, and includes a second elongate slot and a scale formed on the surface thereof and at one side of the second elongate slot;

an adjustment mechanism which straddles the holding plate and the scale plate and is movable upward or downward, and includes an adjustment portion at one side thereof, a protrusive connection portion at another side opposite to the adjustment portion, and a connection plank connecting with the adjustment portion and the protrusive connection portion, the adjustment portion including a guide slot to receive the scale plate and guide the adjustment mechanism to move upward or downward on the scale plate, at least one adjustment member corresponding to the second elongate slot and fastening to the adjustment portion, and an indicator at one end thereof indicating the scale on the scale plate; and an induction mechanism which is located at one side of the protrusive connection portion and is movable with the magnetic element.

2. The vertical flow meter of claim 1, wherein the vertical barrel includes an inlet holder and an outlet holder at the lower end and the upper end thereof respectively and spaced from each other, the inlet holder including two first fastening holes at one side thereof for fastening the holding plate and another two first fastening holes at another side thereof opposite to the holding plate for fastening the scale plate, the outlet holder including two second fastening holes at one side thereof for fastening the holding plate and another two second fastening holes at another side thereof opposite to the holding plate for fastening the scale plate.

3. The vertical flow meter of claim 2, wherein the protrusive inlet coupling portion and the inlet holder respectively include an inlet and an orifice remote from the protrusive inlet coupling portion that communicate with the flow passage, the protrusive outlet coupling portion including an outlet communicating with the flow passage, the protrusive inlet coupling portion and the protrusive outlet coupling portion respectively including external threads for pipes to couple with.

4. The vertical flow meter of claim 3, wherein the holding plate includes two first apertures at an upper side thereof corresponding to the second fastening holes of the outlet holder and another two first apertures at a lower side thereof corresponding to the first fastening holes of the inlet holder, the first apertures at the upper and lower sides of the holding plate being run through by a plurality of first fastening elements to fasten to the second fastening holes and the first fastening holes of the vertical barrel.

5. The vertical flow meter of claim 4, wherein the scale plate includes an adjustment knob at a lower side thereof, the adjustment knob including an adjustment rod running through the orifice and abutting the inlet to adjust flow amount from entering of the vertical barrel the scale plate including two second apertures at an upper side thereof corresponding to the second fastening holes of the outlet holder and another two second apertures at a lower side thereof corresponding to the first fastening holes of the inlet holder, the second apertures at the upper and lower sides of the scale plate being run through by a plurality of second fastening elements to fasten to the second fastening holes and the first fastening holes of the vertical barrel.

6. The vertical flow meter of claim 1, wherein the adjustment portion includes an anchor block, a holding block spaced from the anchor block to form the guide slot therebetween and an adjustment plate located at one side of the anchor block remote from the holding block, the anchor block and the holding block respectively including at least one first coupling hole and at least one second coupling hole corresponding to the second elongate slot of the scale plate, the adjustment plate including at least one adjustment aperture corresponding to and greater than the first coupling hole to receive the adjustment member and adjust the indicator of the adjustment portion to indicate the scale of the scale plate.

7. The vertical flow meter of claim 1, wherein the adjustment mechanism includes a wedge notch between the adjustment portion and the protrusive connection portion to accommodate the vertical barrel, the protrusive connection portion including a first boss and a second boss that are extended toward the wedge notch and a guide notch formed between the first boss and the second boss to accommodate the holding plate so that the adjustment mechanism is movable upward and downward on the holding plate and the scale plate.

8. The vertical flow meter of claim 7, wherein the induction mechanism and the second boss of the protrusive connection portion run through the first elongate slot of the holding plate.

9. The vertical flow meter of claim 1 further including a positioning board fastened to one side of the holding plate remote from the vertical barrel via a first screw fastener and a second screw fastener.

10. The vertical flow meter of claim 9, wherein the positioning board includes a third elongate slot with an upper side run through by the protrusive outlet coupling portion and a lower side run through by the protrusive inlet coupling portion, the third elongate slot further including a notch at one side thereof to allow the induction mechanism and the protrusive connection portion to run through and move upward or downward, the positioning board further including a plurality of fastening holes at an upper end and a lower end thereof to allow a plurality of positioning elements to run through and fasten to the pipes.

* * * * *